(12) United States Patent
Murphy et al.

(10) Patent No.: US 6,406,378 B1
(45) Date of Patent: Jun. 18, 2002

(54) SOUND ENHANCED COMPOSITE GOLF CLUB HEAD

(75) Inventors: James M. Murphy, Laguna Nigel; Herbert Reyes, Oceanside; D. Clayton Evans, San Marcos; J. Andrew Galloway, Escondido; Richard C. Helmstetter, Rancho Santa Fe; Daniel R. Jacobson, San Diego, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/474,697

(22) Filed: Dec. 29, 1999

Related U.S. Application Data

(63) Continuation-in-part of application No. 08/958,723, filed on Oct. 23, 1997, now Pat. No. 6,010,411.

(51) Int. Cl.$^7$ .............................................. A63B 53/04
(52) U.S. Cl. ........................ 473/224; 473/345; 473/348
(58) Field of Search ................................ 473/224, 219, 473/335, 336, 345–349, 305, 311, 327

(56) References Cited

U.S. PATENT DOCUMENTS 1,658,581 A    2/1928  Tobia 4,398,965 A  *  8/1983  Campau (List continued on next page.)

FOREIGN PATENT DOCUMENTS

GB         2 292 332 A      2/1996

OTHER PUBLICATIONS

Article "Metal vs. Plastic Heads" at website www.taylor-madegolf.com/uscan/technology/wp/wp5.asp dated Mar. 20, 2002.*

*Primary Examiner*—Stephen L. Blau
(74) *Attorney, Agent, or Firm*—Michael A. Catania

(57) ABSTRACT

A golf club having a club head composed of a composite material and having an enhanced sound during impact with a golf ball. The golf club head also has a coefficient of restitution greater than 0.8 under test conditions such as the USGA test conditions specified pursuant to Rule 4-1e, Appendix II, of the Rules of Golf for 1998–1999. The golf club head body has a weight strip placed within a ribbon of the body. The sound of the composite golf club head during impact with a golf ball is approximately equivalent to that of a metal wood during impact with a golf ball. The composite golf club head of the present invention has a combined sound level greater than one hundred seventeen decibels during impact with a golf ball.

1 Claim, 12 Drawing Sheets

U.S. PATENT DOCUMENTS

| | | | |
|---|---|---|---|
| 4,496,153 A | | 1/1985 | Kochevar |
| 4,502,687 A | | 3/1985 | Kochevar |
| 4,575,447 A | * | 3/1986 | Hariguchi |
| 4,667,963 A | | 5/1987 | Toneyama |
| 4,778,722 A | | 10/1988 | Yamamure et al. |
| 4,793,616 A | | 12/1988 | Fernandez |
| 4,809,978 A | * | 3/1989 | Yamaguchi et al. |
| 4,874,171 A | | 10/1989 | Ezaki et al. |
| 5,009,425 A | | 4/1991 | Okumoto et al. |
| 5,190,290 A | | 3/1993 | Take |
| 5,228,694 A | | 7/1993 | Okumoto |
| 5,242,168 A | | 9/1993 | Aizawa |
| 5,262,118 A | | 11/1993 | Fukushima et al. |
| 5,318,296 A | | 6/1994 | Adams et al. |
| 5,350,556 A | | 9/1994 | Abe |
| 5,354,059 A | * | 10/1994 | Stuff |
| 5,377,986 A | | 1/1995 | Viollaz et al. |
| 5,429,365 A | | 7/1995 | McKeighton |
| 5,485,998 A | * | 1/1996 | Kobayashi |
| 5,489,098 A | | 2/1996 | Gojny et al. |
| 5,533,728 A | | 7/1996 | Pehoski |
| 5,547,427 A | | 8/1996 | Rigal et al. |
| 5,558,332 A | * | 9/1996 | Cook |
| 5,593,356 A | | 1/1997 | Takeda |
| 5,672,120 A | | 9/1997 | Ramirez |
| 5,674,133 A | | 10/1997 | Chang |
| 5,718,641 A | * | 2/1998 | Lin .......................... 473/224 |
| 5,779,560 A | | 7/1998 | Buck |
| 5,836,830 A | * | 11/1998 | Onuki ........................ 473/349 |
| 5,851,159 A | * | 12/1998 | Burrows ..................... 473/345 |
| 5,908,356 A | * | 6/1999 | Nagamoto ................... 473/224 |
| 5,985,197 A | * | 11/1999 | Nelson ....................... 264/221 |
| 5,989,134 A | | 11/1999 | Antonious |
| 6,102,813 A | * | 8/2000 | Dill .............................. 473/305 |
| 6,165,081 A | * | 12/2000 | Chou |

* cited by examiner

FIG. 24

Legend:
- 200 BACKGROUND
- 202 ADX100
- 204 YONEX 300
- 206 CRANE CVX
- 208 CRANE BACKWEIGHT
- 210 PRESENT INVENTION
- 212 PRESENT INVENTION

SOUND ENHANCED COMPOSITE GOLF CLUB HEAD

CROSS REFERENCES TO RELATED APPLICATIONS

This application is a continuation-in-part application of co-pending U.S. patent application Ser. No. 08/958,723, filed on Oct. 23, 1997, now U.S. Pat. No. 6,010,411, which is hereby incorporated by reference in its entirety.

STATEMENT REGARDING FEDERALLY SPONSORED RESEARCH OR DEVELOPMENT

Not Applicable.

BACKGROUND OF THE INVENTION

1. Field of the Invention

The present invention relates to a golf club head composed of a composite material. More specifically, the present invention relates to a golf club head composed of composite material and designed to have an enhanced sound when impacting a golf ball.

2. Description of the Related Art

When a golf club head strikes a golf ball, large impacts are produced that load the club head face and the golf ball. Most of the energy is transferred from the head to the golf ball, however, some energy is lost as a result of the collision. The golf ball is typically composed of polymer cover materials (such as ionomers) surrounding a rubber-like core. These softer polymer materials having damping (loss) properties that are strain and strain rate dependent which are on the order of 10–100 times larger than the damping properties of a club striking plate.

Golfers have become accustomed to hearing a particular sound when the club face impacts the golf ball, especially when a driver or fairway wood is used by the golfer. This "sound expectation" has grown tremendously since the introduction of hollow metal woods. This particular sound imparts a sensation to the golfer of a good shot, a quality club or both.

The sound expectation from a metal wood has become so entrenched that woods lacking this particular sound are believed to be inferior or are undesired by golfers. This sound expectation has greatly effected composite golf clubs since current composite golf clubs have an undesirable "thud" sound, reminiscent of persimmon woods.

Further, the current manufacturers of composite golf clubs have had no desire to improve the sound since improving the performance and lowering the costs of the composite golf clubs have been the major design concerns of such manufacturers. Thus, although the performance and price of composite golf clubs have improved, the sound has remained unchanged and is an obstacle to increased acceptance of composite golf clubs.

BRIEF SUMMARY OF THE INVENTION

The present invention provides a composite golf club head that has a predetermined sound during impact with a golf ball. The present invention is able to accomplish this by designing the composite golf club head in a particular shape and orienting the plies of pre-preg composite sheets to enhance the sound during impact with a golf ball.

One aspect of the present invention is a golf club head having a body composed of a composite material and having a combined sound level greater than one hundred seventeen decibels during impact with a golf ball. The golf club head also has a coefficient of restitution of at least 0.83 under test conditions, such as those specified by the USGA. The standard USGA conditions for measuring the coefficient of restitution is set forth in the *USGA Procedure for Measuring the Velocity Ratio of a Club Head for Conformance to Rule 4-1e*, Appendix II Revision I, Aug. 4, 1998 *and Revision 0*, Jul. 6, 1998, available from the USGA.

Another aspect of the present invention is a composite golf club head having a body, a weight strip and a sole plate. The body has a hollow interior and is composed of a plurality of plies of pre-preg sheets. The body has a striking plate, a sole, a crown, a ribbon juxtaposed by the sole and the crown, a heel end and a toe end. The weight strip is disposed on the ribbon. The sole plate has an integral hosel tube and is attached to the sole with the integral hosel tube disposed in the hollow interior. The composite golf club head has a combined sound level greater than one hundred seventeen decibels during impact with a golf ball when measured from a distance of sixty-four inches from the impact point.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 24 is a graph of time versus sound level for composite golf club heads with the sound level scaled to illustrate the differences between composite golf club heads.

DETAILED DESCRIPTION OF THE INVENTION

Figure 1:
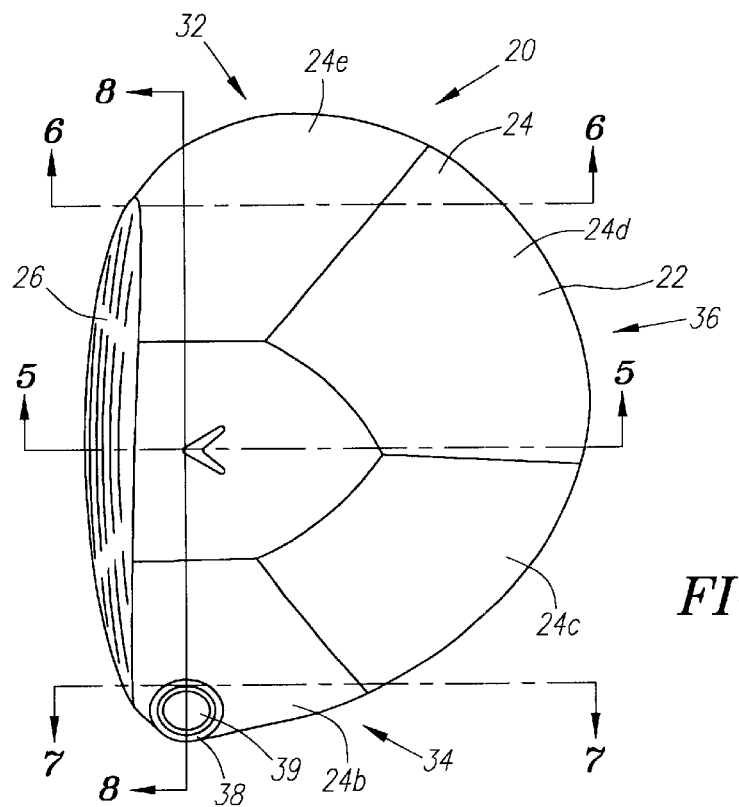
FIG. 1 is a top plan view of a golf club head of the present invention.
Figure 2:
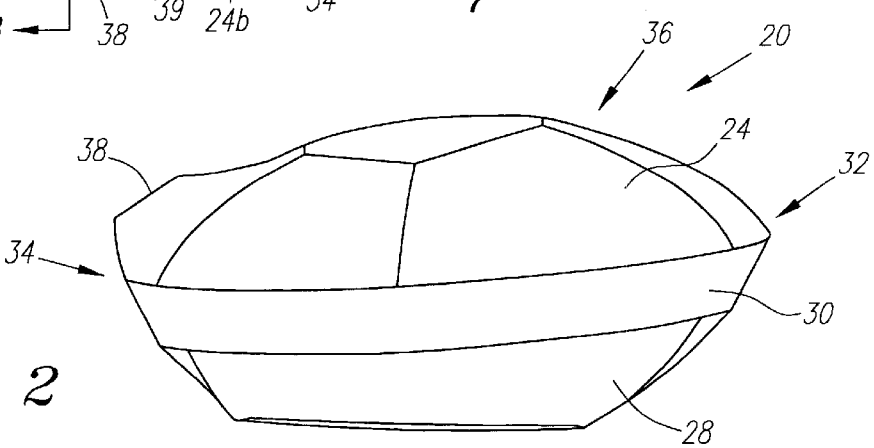
FIG. 2 is a rear view of the golf club head of FIG. 1.
Figure 3:
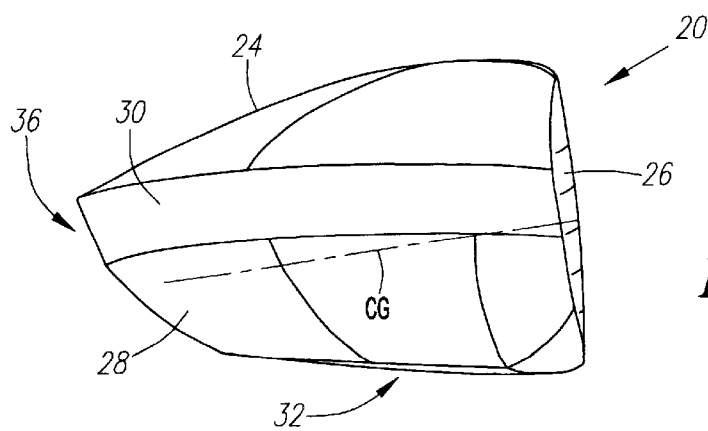
FIG. 3 is a toe end view of the golf club head of FIG. 1.
Figure 4:
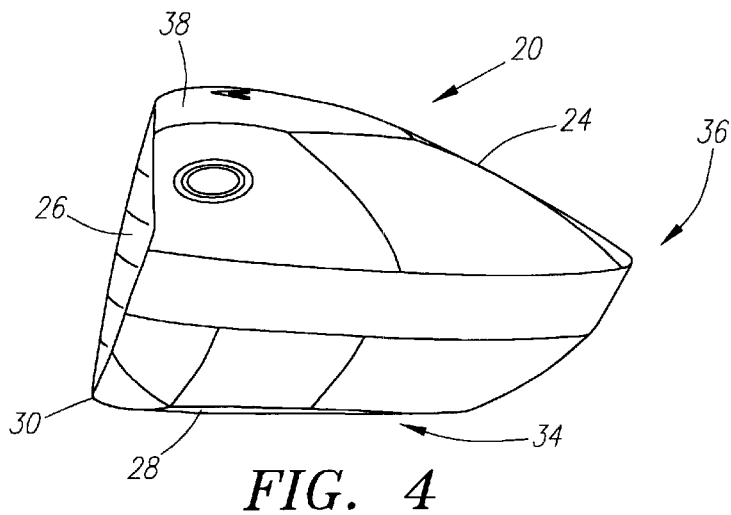
FIG. 4 is a heel end view of the golf club head of FIG. 1.

The present invention is directed at a composite golf club head having an enhanced sound during impact with a golf ball while also having increased performance. More precisely, the composite golf club head of the present invention is louder over long periods of time relative to current composite golf club heads, and it has a high coefficient of restitution.

Sound, or specifically sound waves are longitudinal mechanical waves that compress a medium such as air to stimulate the human ear and brain for the sensation of hearing. The frequency range that can stimulate the human ear for hearing is designated the audible range and ranges from 20 Hertz (cycles) to 20,000 Hertz. The sound waves create a pressure that varies depending on the medium, the frequency and distance. The human ear can tolerate a sound pressure of 28 Pascals, and can detect a sound pressure as low as $2.0 \times 10^{-5}$ Pascals. Sound, or the sound level, is measured in decibels (named after Alexander Graham Bell), and is a parameter related to the intensity of a sound wave according to the following equation:

♥=10 $\log_{10}$ (I/$I_o$) wherein I is the intensity and $I_o$ is a standard reference intensity ($I_o = 10^{-12}$ W/m$^2$). The intensity I may be found from the pressure amplitude wherein the average intensity I=(½)$P_m^2$/v ♥$_o$ wherein $P_m$=the pressure amplitude of the sound in air, v=the velocity of sound in air, and ♥$_o$=the density of air. When I=$I_o$, the sound level is zero decibels which is the threshold of hearing. For reference, a whisper is twenty decibels, normal conversation is sixty decibels, a pneumatic drill at a distance of three meters has a sound level of ninety decibels, and a jet engine at fifty meters has a sound level of one hundred thirty decibels. A golf club striking a golf ball will emit certain sound levels according to the material and construction of the golf club.

As shown in FIGS. 1–4, a golf club head of the present invention is generally designated 20. The club head 20 may be a fairway wood or a driver. The club head 20 has a body 22 that is generally composed of a composite material such as plies of carbon pre-peg sheets. The body 22 has a crown 24, a striking plate 26, a sole 28 and a ribbon 30 juxtaposed by the sole 28 and the crown 24. The ribbon 30 generally extends from a toe end 32 to a heel end 34. The ribbon 30 generally begins at one end of the striking plate 26 and ends at an opposite end of the striking plate 26. A rear 36 of the body 22 is opposite the striking plate 26 and is defined by portions of the ribbon 30, the crown 24 and the sole 28. Also, at the heel end 34 of the club head 20 is a hosel 38 with an opening 39 for placement of a shaft therein.

The ribbon 30 increases the volume of the club head 20 and also assists in creating a club head 20 with a higher moment of inertia. The ribbon 30 also provides for a flatter crown 24 or crown 24 with a lesser radius of curvature than the crown of a traditional wood club head such as the GREAT BIG BERTHA® golf club available from Callaway Golf Company of Carlsbad, Calif. As shown in FIG. 1, the crown may be partitioned into sections 24a–24e. A crown central section 24a is the flattest section having little or no curvature. A crown hosel section 24b is downwardly convex toward the hosel 38. Crown rear sections 24c and 24d are downwardly convex toward the ribbon 30, as is crown toe section 24e. The flatness in the crown 24 assists in enhancing the sound of the composite golf club head 20 to simulate the sound of a metal wood golf club head, as described in greater detail below.

Figure 5:
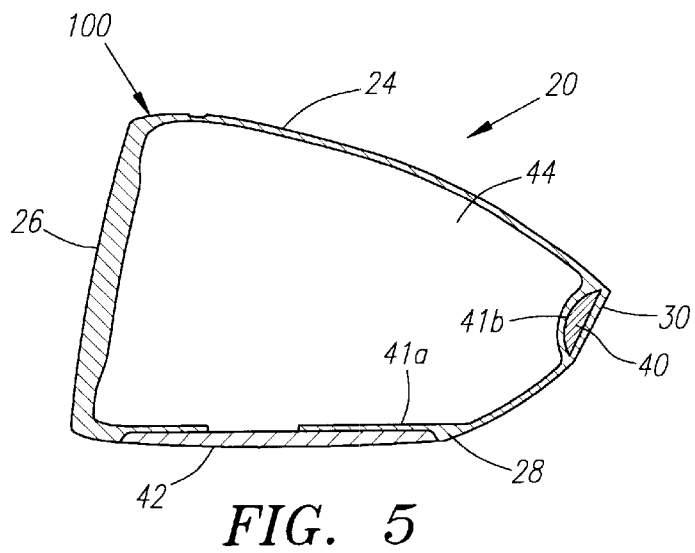
FIG. 5 is a cross-sectional view of the golf club head of FIG. 1 along line 5—5.
Figure 6:
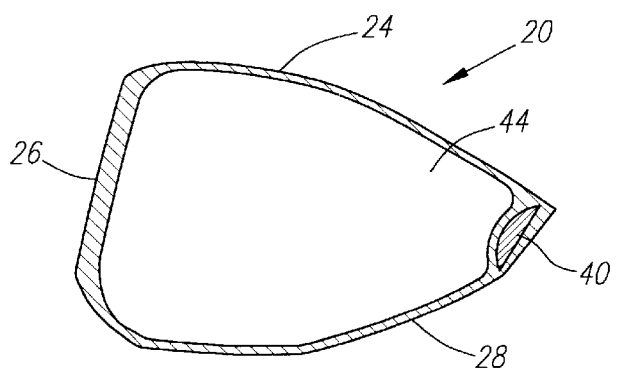
FIG. 6 is a cross-sectional view of the golf club head of FIG. 1 along line 6—6.
Figure 7:
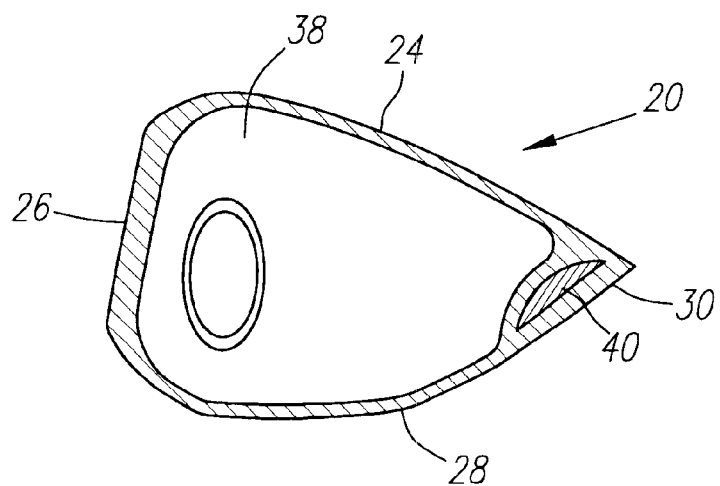
FIG. 7 is a cross-sectional view of the golf club head of FIG. 1 along line 7—7.

As shown in FIGS. 5–8, the club head 20 has a weight strip 40 disposed in the ribbon 30 of the club head 20. The weight strip 40 is preferably embedded within layers of the plies of pre-peg 41a–b. The weight strip 40 is further described in co-pending U.S. patent application Ser. No. 09/474,688, filed on Dec. 29, 1999, and entitled A Composite Golf Club Head With An Integral Weight Strip, which is hereby incorporated in its entirety. A sole plate 42 is attached to the sole 28 of the body 22. Also, as shown in FIG. 5, a return 100 is a transition area from the striking plate 26 to the crown 24. The return 100 has a predetermined thickness ranging from 0.100 inches to 0.200 inches to control the compliance of the striking plate 26.

Figure 8:
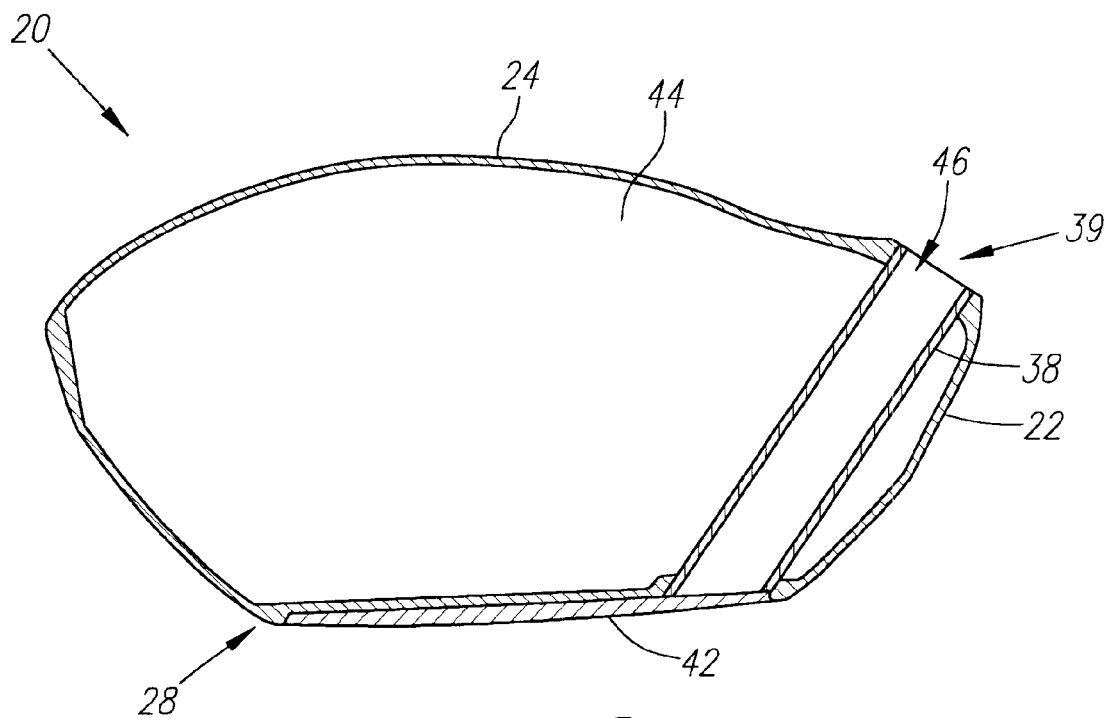
FIG. 8 is a cross-sectional view of the golf club head of FIG. 1 along line 8—8.

As shown in FIG. 8, sole plate 42 may be integral with the hosel 38 forming a sole plate hosel integral piece 43 that is incorporated into the club head 20. The hosel 38 lies within the hollow interior 44 of the club head 20. Preferably, the club head 20 has a hollow interior 44, however, the light weight of the composite body 22 allows for numerous manipulations in placement of weight, foam, and the like within the hollow interior 44.

Figure 9:
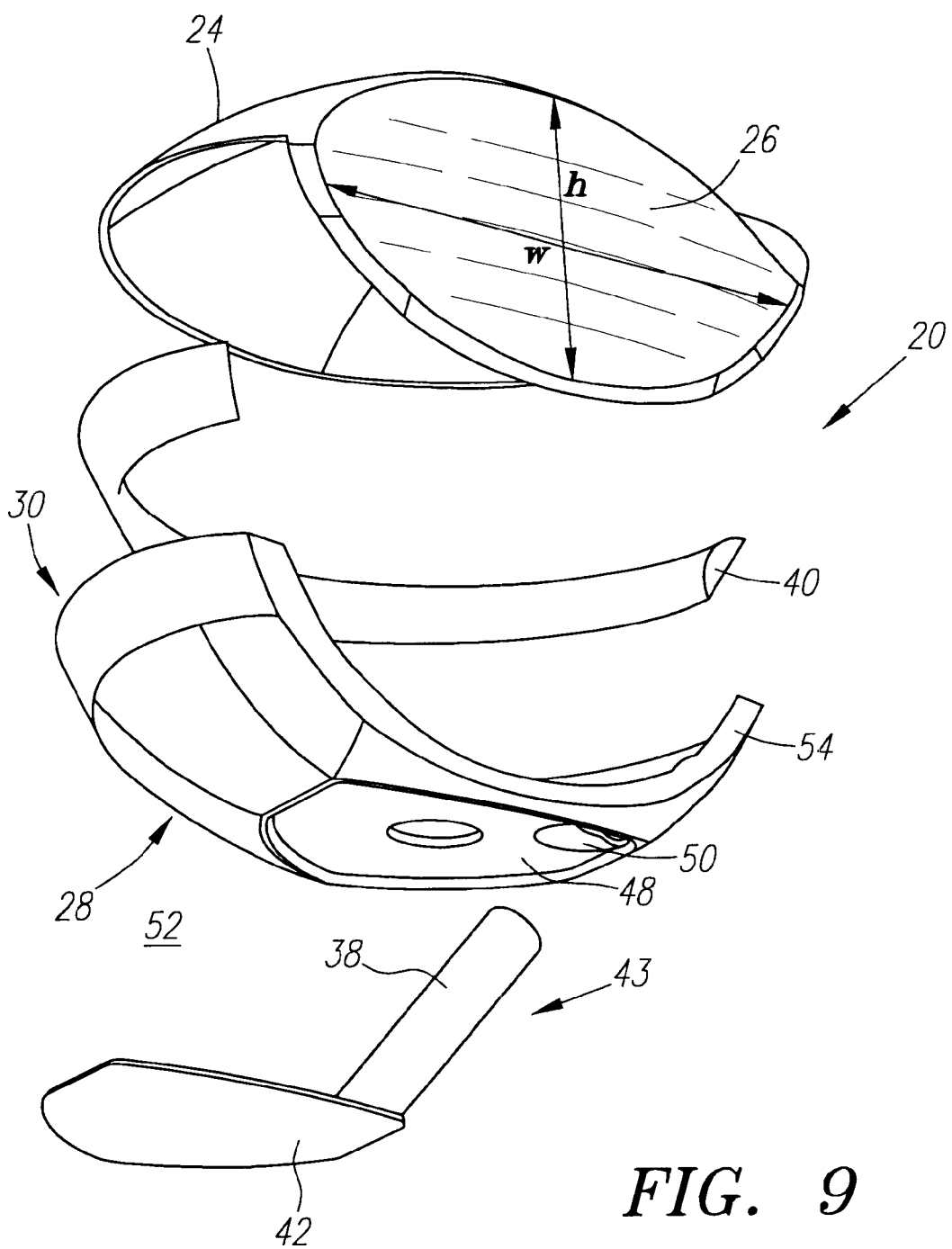
FIG. 9 is an exploded view of the golf club head of the present invention.

As shown in FIG. 9, the sole plate hosel integral piece 43 is inserted into a sole cavity that is shaped to accommodate the sole plate 42. The hosel 38 is inserted through a hosel aperture 50 to connect with the shaft opening 39 for placement of a shaft therethrough. A sole plate aperture 52 allows for access to the hollow interior 44 through the sole 28 which is utilized for fabrication of club head 20 as described below. In a preferred embodiment, the sole plate hosel integral piece 43 is composed of a stainless steel material. The sole plate hosel integral piece 43 is further described in co-pending U.S. patent application Ser. No. 09/474,927, filed on Dec. 29, 1999, and entitled Integral Sole Plate And Hosel For A Golf Club Head, which is hereby incorporated in its entirety.

The weight strip 40 is preferably composed of a metal material such as copper, tungsten steel, aluminum, tin, silver, gold, platinum, or the like. A preferred metal is copper. The weight strip 40 has a density greater than the composite material of the body 22. Preferably, the weight strip 40 extends from approximately the heel end 34 of the striking plate 26 through the rear 36 to the toe end 32 of the striking plate 26. However, the weight strip 40 may only extend along the rear 36 of the ribbon 30, the heel end 34 of the ribbon 30, the toe end 32 of the ribbon 30, or any combination thereof. Preferably the weight strip 40 occupies the majority of area of the ribbon 30. However, the weight strip 40 may only occupy a small area of the ribbon 30. Alternatively, a densified loaded film may be substituted for the weight strip 40. A description of such a densified loaded film is set forth in U.S. Pat. No. 6,010,411, filed on Oct. 23, 1997, entitled Densified Loaded Films In Composite Golf Club Heads, which is hereby incorporated in its entirety.

The coefficient of restitution of the club head 20 of the present invention under standard USGA test conditions with a given ball ranges from 0.8 to 0.9, preferably ranges from 0.83 to 0.88 and is most preferably 0.876. The thinness of the striking plate 26 and the orientation of the plies of pre-peg allow the golf club head 20 of the present invention to achieve a coefficient of restitution greater than 0.83. The weight strip 40 and the integrated sole plate and hosel 43 also assist in increasing the coefficient of restitution of the golf club head 20 of the present invention.

Additionally, the thickness of the return 100 of the golf club head 20 allows for a greater deflection in the striking plate 26 which also increases the coefficient of restitution of the golf club head 20. The return 100 couples the striking plate 26 to the crown 24 which reduces the loss of energy to the striking plate 26 during impact with a golf ball. If the return 100 is too thick, the striking plate 26 is isolated and rigid, thereby reducing the coefficient of restitution. If the return 100 is too thin, failure of the striking plate 26 may occur upon impact with a golf ball.

Additionally, the striking plate 26 of the present invention has a smaller aspect ratio than striking plate plates of the prior art. The aspect ratio as used herein is defined as the width, "w", of the striking plate divided by the height, "h", of the striking plate 26, as shown in FIG. 9. In one embodiment, the width w is 90 millimeters and the height h is 54 millimeters giving an aspect ratio of 1.666. In conventional golf club heads, the aspect ratio is usually much greater than 1. For example, the original GREAT BIG BERTHA® driver had an aspect ratio of 1.9. The aspect ratio of the present invention preferably ranges from 1.0 to 1.7.

The club head 20 of the present invention also has a greater volume than a club head of the prior art while maintaining a weight that is substantially lower or equivalent to that of the prior art. The volume of the club head 20 of the present invention ranges from 175 cubic centimeters to 400 cubic centimeters, and more preferably ranges from 300 cubic centimeters to 310 cubic centimeters. The weight of the club head 20 of the present invention ranges from 165 grams to 300 grams, preferably ranges from 175 grams to 225 grams, and most preferably from 188 grams to 195 grams.

FIGS. 10–17 illustrate preferred pre-preg sheets for forming the composite body of the golf club head 20 of the present invention. Each of the pre-preg sheets have a specific orientation that, as explained below, assists in enhancing the sound of the golf club head 20 during impact with a golf ball.

Figure 10:
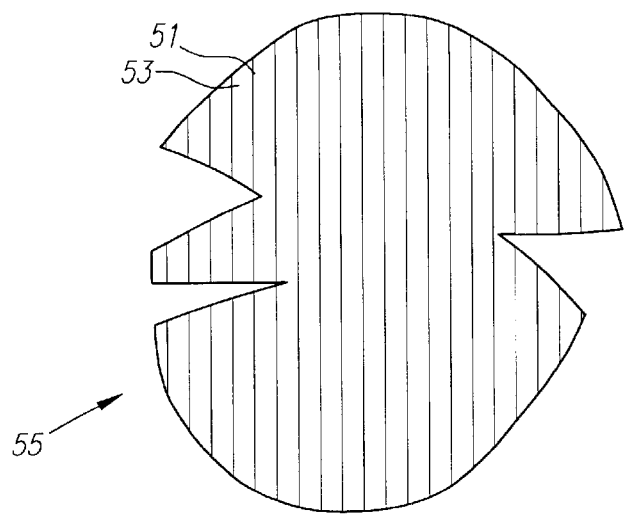
FIG. 10 is a plan view of a striking plate/crown ply having a zero degree orientation.
Figure 11:
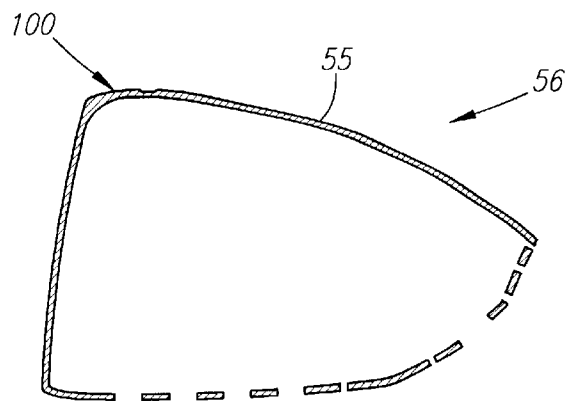
FIG. 11 is a cross-sectional view of a striking plate/crown ply on a golf club head of the present invention.

FIGS. 10 and 11 illustrate a face/crown ply pre-preg sheet that is generally designated 55. The face/crown ply 55 has a plurality of fibers 51 dispersed within a resin body 53. The fibers 51 are preferably composed of a carbon material. Alternatively, the fibers 51 may be aramid fibers, glass fibers or the like. The relation of the fibers 51 to the striking plate 26, when the striking plate 26 is in a position to strike a golf ball, determines the orientation of the fibers 51. If the fibers 51 are parallel with the striking plate 26, or in other words extending across from the toe end to the heel end, as shown in FIG. 10, then the face/crown ply 55 has a zero orientation. As shown in FIG. 11, when positioned on a preform 56 of the golf club head body 22, the face/crown ply 55 extends from the rear end 36 of the club head 20 to the bottom of the striking plate 26 and then inward to engage plies of pre-preg sheets for the sole 28.

Figure 12:
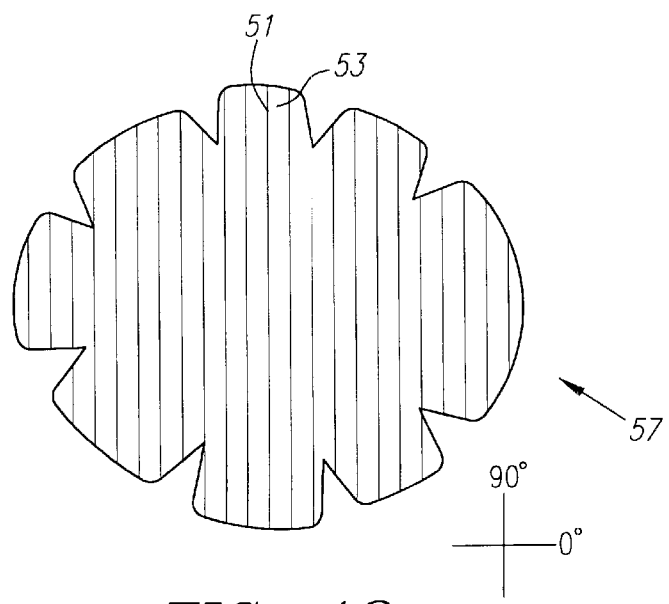
FIG. 12 is a plan view of a full striking plate ply having a zero degree orientation.
Figure 13:
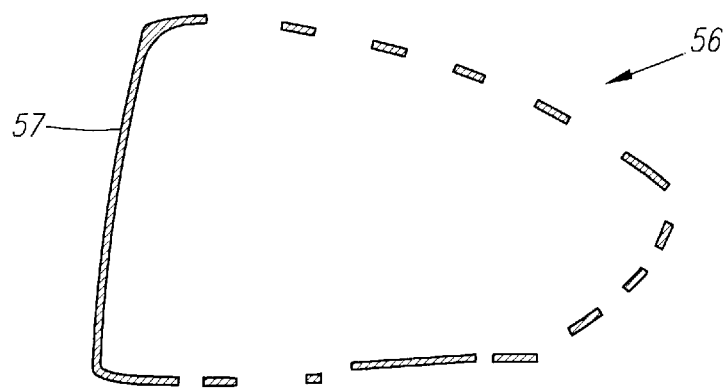
FIG. 13 is a cross-sectional view of a full striking plate ply on a golf club head of the present invention.

FIGS. 12 and 13 illustrate a full face ply pre-preg sheet that is generally designated 57. As with the face/crown ply 55, the full face ply 57 has a plurality of fibers 51 dispersed within a resin body 53. The fibers 51 extends from the sole 28 to the crown 24, and thus the full face ply 57 has fibers 51 that are perpendicular to the striking plate 26 when it is in a position for striking a golf ball. Therefore, the full face ply 57 of FIG. 12 has a zero degree orientation. As shown in FIG. 13, the full face ply 57 essentially covers the striking plate 26 with extensions to engage the pre-preg sheets of the crown 24 and the sole 28.

Figure 14:
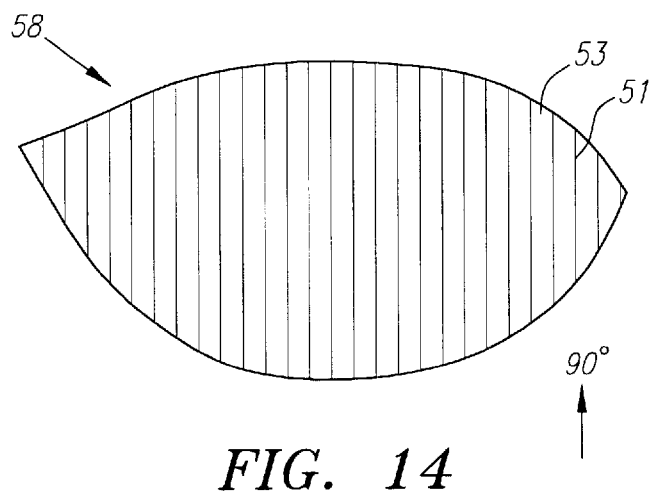
FIG. 14 is a plan view of a striking plate doubler ply having a ninety degree orientation.
Figure 15:
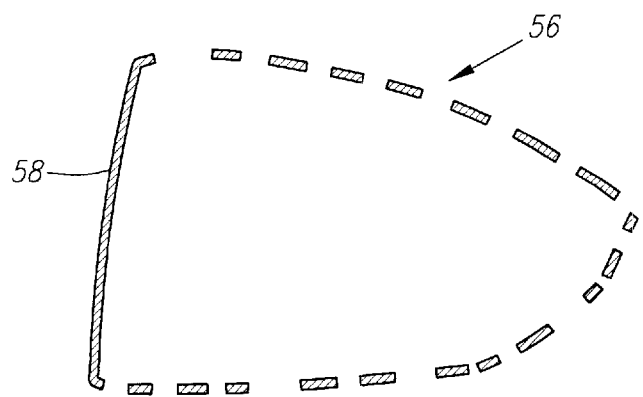
FIG. 15 is a cross-sectional view of a striking plate doubler ply on a golf club head of the present invention.

FIGS. 14 and 15 illustrate a face doubler ply pre-preg sheet that is generally designated 58. As with the face/crown ply 55, the face doubler ply 58 has plurality of fibers 51 dispersed within a resin body 53. The fibers 51 extend from the sole 28 to the crown 24, and thus the face doubler ply 58 has fibers 51 that are perpendicular to the striking plate 26 when it is in a position for striking a golf ball. Therefore, the face doubler ply 58 of FIG. 14 has a ninety degree orientation. As shown in FIG. 15, the face doubler ply 58 essentially covers the striking plate 26 and is used in conjunction with a full face ply 57, a face/crown ply 55, or both.

Figure 16:
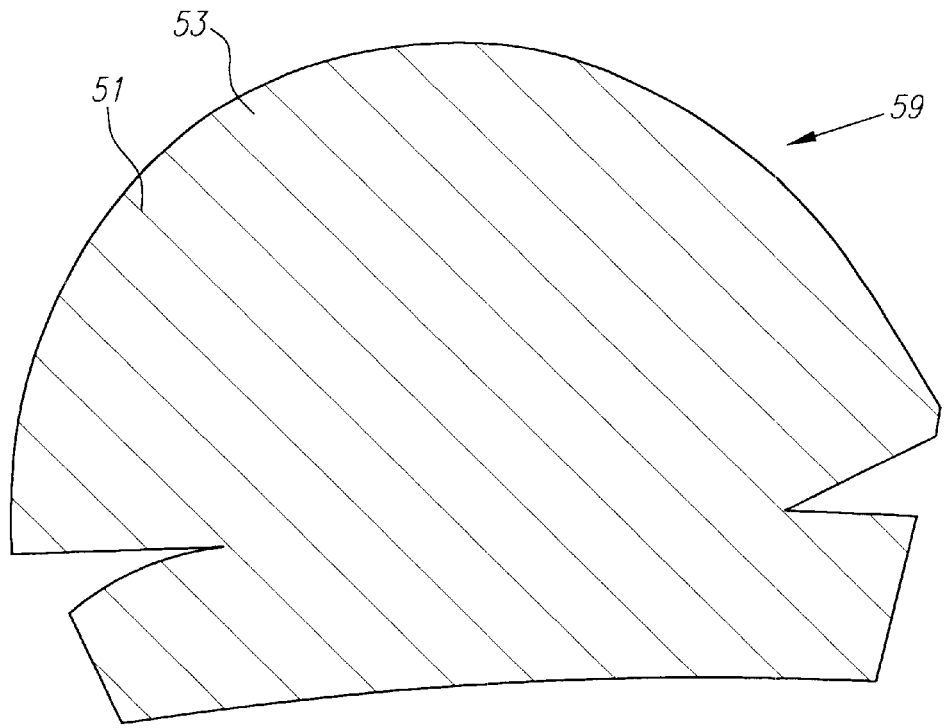
FIG. 16 is a plan view of a sole ply having a forty-five degree orientation.
Figure 17:
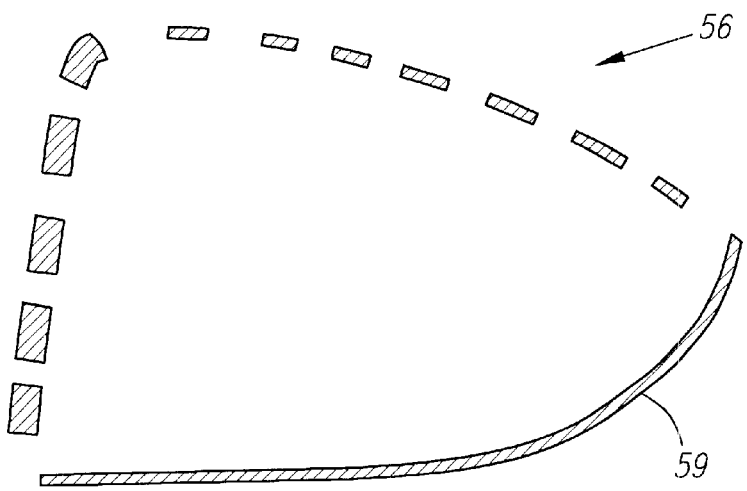
FIG. 17 is a cross-sectional view of a sole ply on a golf club head of the present invention.

FIGS. 16 and 17 illustrate a sole ply pre-preg sheet that is generally designated 59. As with the face/crown ply 55, the sole ply 59 has a plurality of fibers 51 dispersed within a resin body 53. The fibers 51 extend at a forty-five degree angle relative to the striking plate 26 when it is in a position for striking a golf ball. Therefore, the sole ply 59 of FIG. 16 has a forty-five degree orientation. As shown in FIG. 17, the sole ply 59 defines the sole 28 and the ribbon 30.

As previously stated, the preferred composite material is plies of carbon pre-peg sheets. Plies of pre-preg composite sheets are manufactured by pulling strands of fiber in a parallel motion, preferably carbon, aramid or glass fiber, through a resin film and allowing the resin to partially cure or "stage". When the resin is partially staged, the resin holds the fibers together such that the fibers form a malleable sheet with all of the fibers in a specific orientation relative to an edge of the sheet. Preferred orientations are zero degrees, plus forty-five degrees, minus forty-five degrees and nine degrees. Exemplary carbon pre-preg fiber sheets may be obtained from Newport Composites of Santa Ana, Calif. Fiberite Inc. of Greenville, Tex., or Hexcel Inc. of Pleasonton, Calif. Alternatively, the layers of the composite body 22 may comprise a plurality of plies of composite fiber without any resin, each typically comprising a continuous fiber braid or mat, that are used to make a dry reinforcement preform, as described in U.S. Pat. No. 6,010,411, filed on Oct. 23, 1997, which is hereby incorporated by reference in its entirety.

Figure 18:
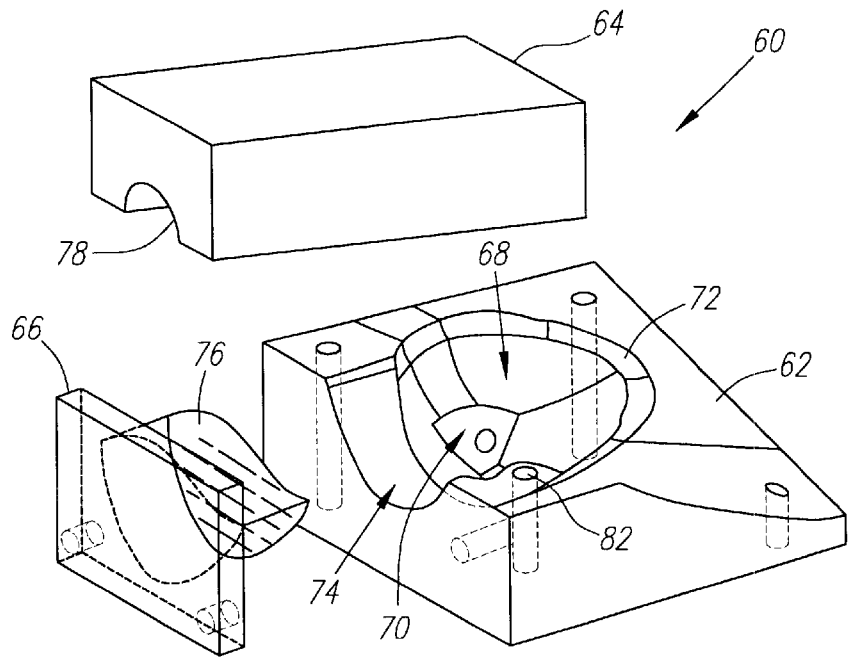
FIG. 18 is an exploded view of a multiple piece mold utilized to produce a golf club head of the present invention.
Figure 19:
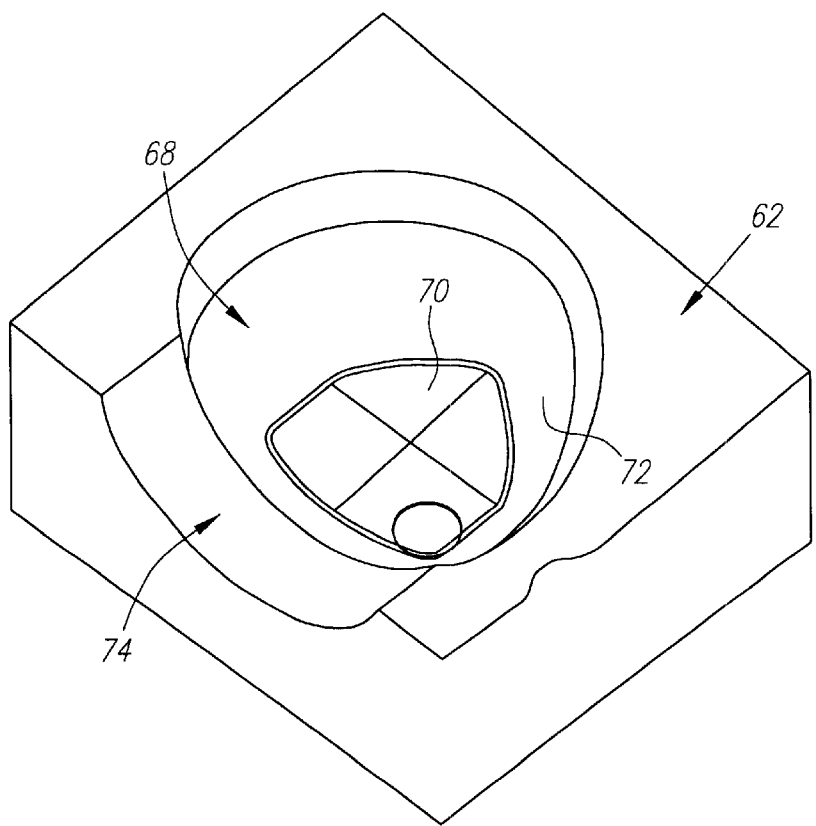
FIG. 19 is an isolated view of the sole piece of the mold of FIG. 18.

A forming mold for the golf club head 20 may be male or female, although female forming molds are presently preferred. As shown in FIG. 18, the mold 60 is composed of three pieces, a sole piece 62, a crown piece 64 and a face piece 66, which are brought together during the molding process. The face piece 66 may be attached to the crown piece 64 prior to placement of the plies thereon. The sole piece 62 has a main cavity 68 with a sole plate bulge 70 and a ribbon section 72. The sole piece 62 also has a front opening 74. The face piece 66 has a face projection 76 that is placed in the front opening of the sole piece 62. The crown piece 64 has a crown cavity 78. The sole piece 62 also has a bladder port 82.

The plies of pre-preg sheets 55, 57, 58 and 59, and if desired a weight strip 40 are applied to the forming mold 60 in a predetermined manner to create a preform 56. The layers of plies of pre-peg sheets 55, 57, 58 and 59 are first applied to predetermined locations on the forming mold 60. The weight strip 40 is then placed within the ribbon section 72 of the sole piece 62. Then, additional sole plies 59 are applied over the weight strip 40, thereby resulting in the weight strip being embedded in the ribbon 30 of the composite body 22 of the preform 56.

Alternatively, additional sole plies 59 are not placed over the weight strip 40, resulting in the weight strip 40 having one surface co-cured to the interior wall of the ribbon 30 of the body 22, and another surface exposed to the hollow interior 44. The face/crown plies 55, full face plies 57 and face doubler plies 58 are placed over the face bulge 76 and the crown cavity 78.

Because the golf club head 20 comprises a substantially enclosed composite body 22 having a hollow core 44, it may be necessary to make a preform 56 in two or more separate pieces or sections, which may be assembled and cured into a finished golf club head 20.

Figure 20:
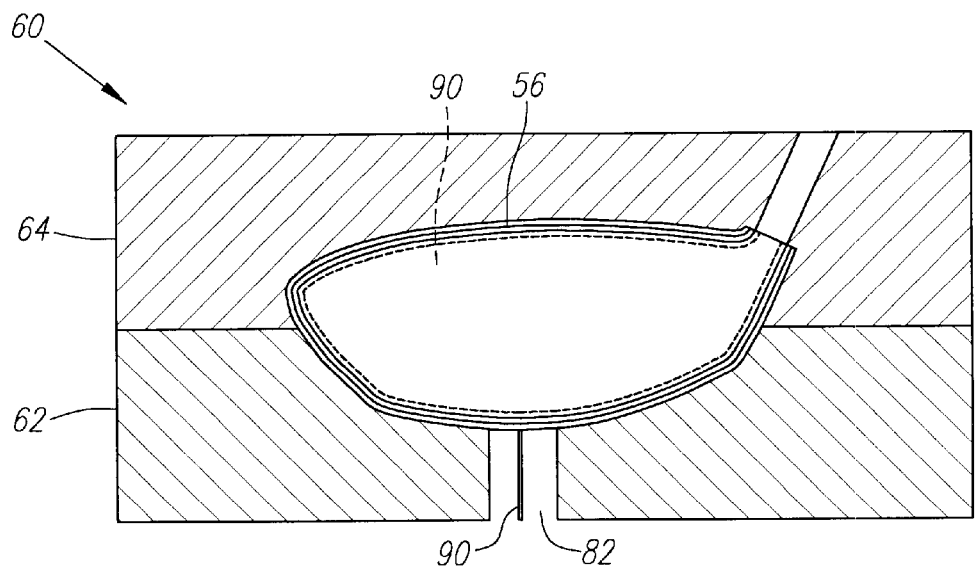
FIG. 20 is a front cross-sectional view of a preform for a golf club head of the present invention in a mold.
Figure 21:
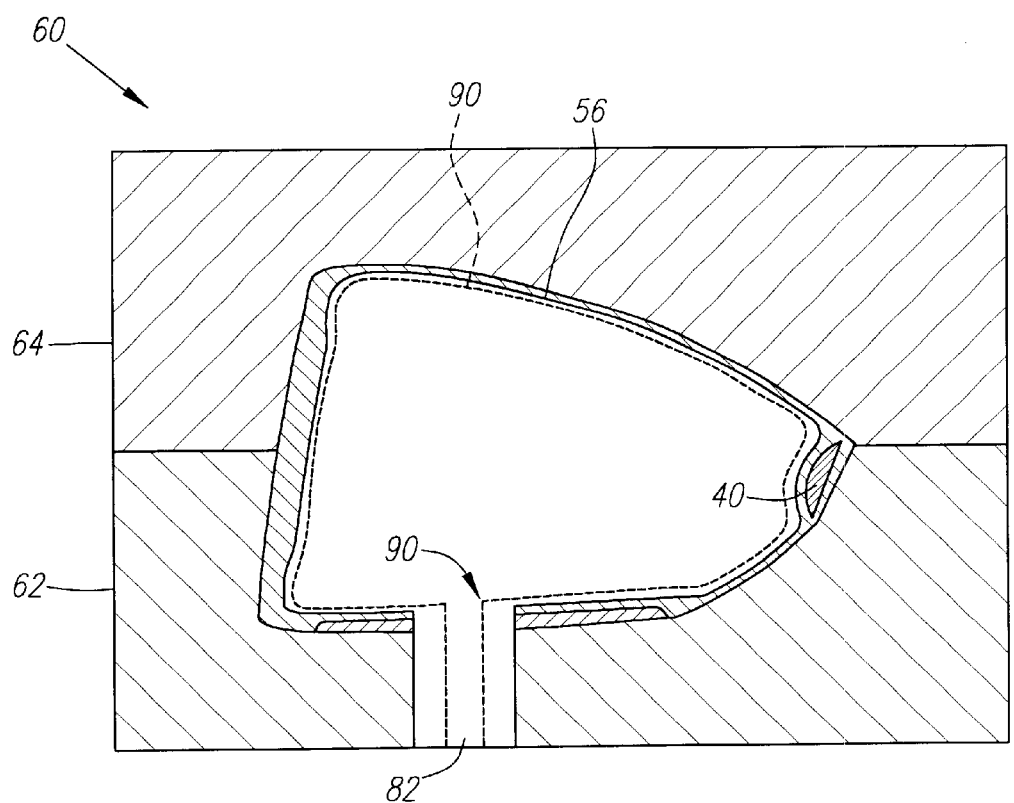
FIG. 21 is a side cross-sectional view of a preform for a golf club head of the present invention in a mold.
Figure 22:
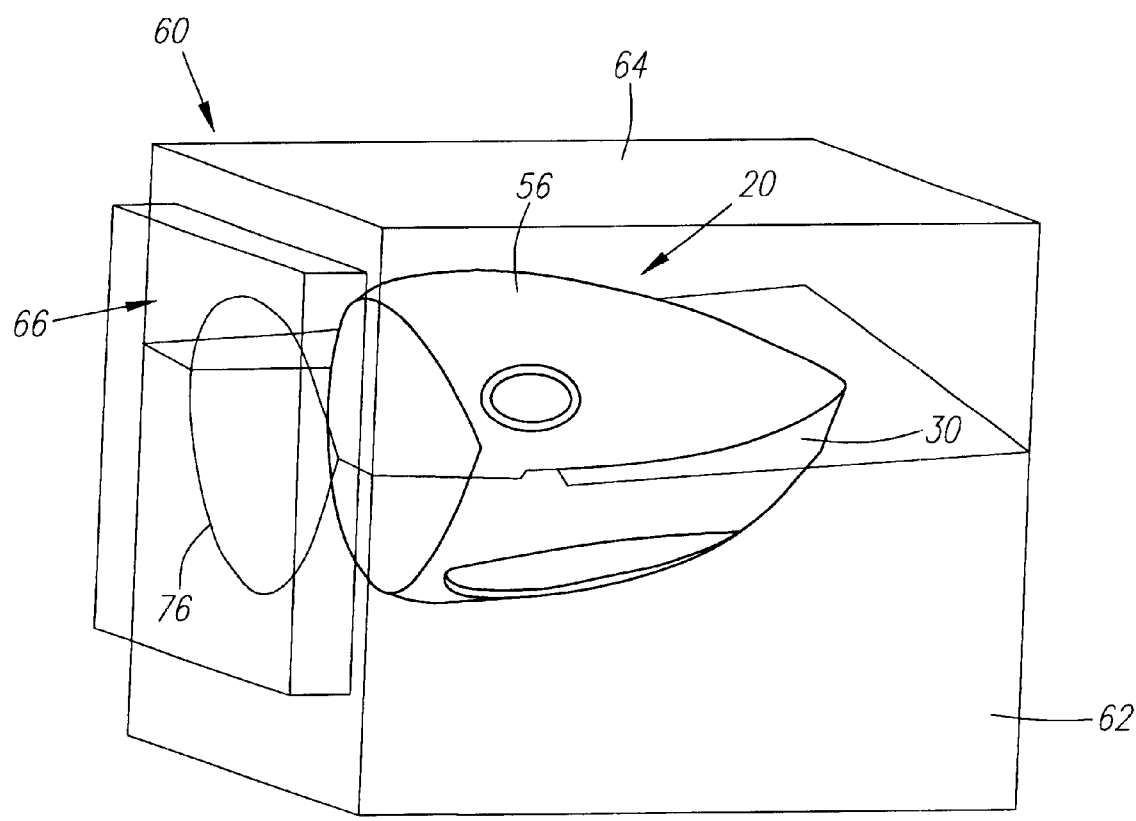
FIG. 22 is a view of a cured golf club head of the present invention within a mold.

As shown in FIGS. 20–22, once the pieces of the mold 60 are assembled together, an inflatable bladder 90, (not shown) preferably made from latex, silicone, or similar materials, may be introduced into the hollow core 44, through the port opening 82. The resulting opening 52 of the golf club head 20 is covered by the integral hosel and sole plate 43. Once the bladder 90 has been positioned within the hollow core 44 of the preform, a source of pressurized gas (not shown) may be attached by a gas line to the bladder 90, and the bladder 90 may be inflated within the hollow core 44. The bladder 90 thereby engages the inside surface of the preform 56, forcing the plies of pre-preg sheets 55, 57, 58 and 59 and the weight strip 40 against the inner wall of the mold 60. The mold 60 may then be heated at a predetermined temperature for a selected period of time, i.e., a time sufficient to allow proper curing of the resin within the pre-preg sheets 55, 57, 58 and 59 and weight strip 40. After depressurizing, the bladder 90 may be removed through the port opening 82, and the golf club head 20 may be removed from the mold 60. The finished golf club head 20 within the mold 60 is shown in FIG. 22.

Those skilled in the art will appreciate that, depending upon the type of resin used, curing temperatures may range from 250° to 800° F., the requisite curing time may range from a few minutes (for example, in the case of a "quick cure" epoxy or a thermoplastic resin) to 1.5 hours, and the pressure applied via the latex or silicone bladder 90 may range from 100 to 300 psi.

In a first example, the striking plate 26 and crown 24 of the body 22 is composed of 19 full face plies 57 and 8 face/crown plies 55 in a quasi-isotropic orientation. A quasi-isotropic orientation is defined as beginning at a zero degree orientation and rotating angles in at least fifteen degree intervals. Preferably, the orientations are zero degrees, plus forty-five degrees, minus forty-five degrees, and ninety degrees. The sole 28 and ribbon 30 of the body 22 are composed of eight sole plies 59 and a weight strip 40 in a quasi-isotropic orientation. The striking plate 26 of this example has a thickness of 0.117 inches, a return 100 thickness of 0.117 inches, and a coefficient of restitution of 0.876.

In a second example, the striking plate 26 and crown 24 of the body 22 are composed of nineteen full face plies 57, eight face/crown plies 55 and two face doubler plies 58, all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.122 inches, a return 100 thickness of 0.117 inches, and a coefficient of restitution of 0.863.

In a third example, the striking plate 26 and crown 24 of the body 22 are composed of twenty-six full face plies 57, eight face/crown plies 55 and six face doubler plies 58 all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.140 inches, a return 100 thickness of 0.120 inches, and a coefficient of restitution of 0.851.

In a fourth example, the striking plate 26 and crown 24 of the body 22 are composed of nineteen full face plies 57, eight face/crown plies 55 and ten face doubler plies 58 all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.152 inches, a return 100 thickness of 0.117 inches, and a coefficient of restitution of 0.834.

In a fifth example, the striking plate 26 and crown 24 of the body 22 are composed of twenty-eight full face plies 57, eight face/crown plies 55 and two face doubler plies 58, all in quasi-isotropic orientations. The sole 28 and ribbon 30 of the body 22 are composed of eight sole plies 59 and a weight strip 40 in a quasi-isotropic orientation. The striking plate 26 of this example has a thickness of 0.135 inches, a return 100 thickness of 0.126 inches, and a coefficient of restitution of 0.851.

Figure 23:
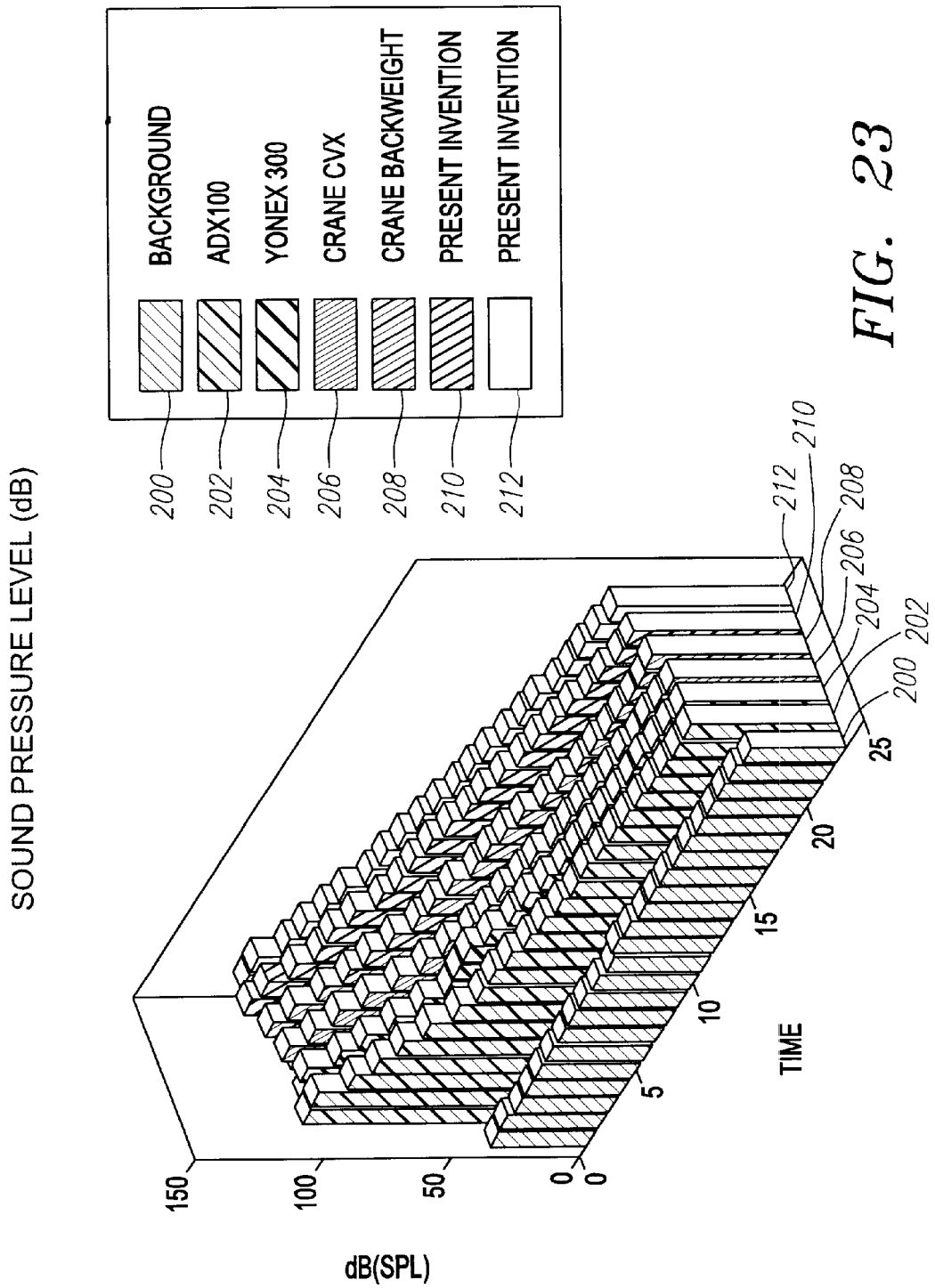
FIG. 23 is a graph of time versus sound level for composite golf club heads.

FIGS. 23 and 24 are graphs of the sound levels of composite golf club heads, including the composite golf club head 20 of the present invention. Table One contains the calculated measurements utilized to chart the graphs. FIG. 24 is a scaled version of FIG. 23 to illustrate the differences between the composite golf club heads. The horizontal axis on each graph of FIGS. 23 and 24 represents time as time steps in increments of 0.0025 seconds. Thus, five time steps are equivalent to 0.0125 second and twenty time steps are equivalent to 0.05 seconds. The vertical axis is a measurement of the sound level of each golf club head during impact with a golf ball. The plotted sound level is the sum of the sound pressure level from the following third octave bands: 5000 Hz; 6300 Hz; 8000 Hz; 10,000 Hz; 12500 Hz; 16,000 Hz; and 20,000 Hz. These octave bands were chosen due to the equivalency in sound to metallic woods. In measuring the sound level, a microphone was placed sixty-four inches away from a teed golf ball. The microphone was also elevated approximately twelve inches from the ground. The golf ball used for the test was a TITLEIST TOUR BALATA golf ball. A golfer swung each of the golf clubs at a velocity of approximately one hundred twenty miles per hour for golf clubs with shafts of forty-five inches in length, and one hundred twenty-eight miles per hour for golf clubs with shafts of fifty inches in length. A measurement was taken at each time step interval ( 0.0025 seconds), and each measurement was filtered through a conventional sound meter (Larson Davis System 824) at the various frequency bands to generate a measurement of the sound at each of the particular frequency bands. These measurements were combined to obtain the combined sound level measurements in Table One for each time step interval. There was also a Doppler effect due to the movement of the golf club during impact with the golf ball as the golf ball is launched from the golf club striking plate.

Referring to FIGS. 23 and 24, the first row of sound levels 200 represents the background noise, or the ambient noise level. The second row of sound levels 202 is representative of an ADX 100 composite golf club head available from Yonex Golf of Tokyo, Japan. The third row of sound levels 204 is representative of a Aerona 300 composite golf club head available from Yonex Golf of Tokyo Japan. The fourth row of sound levels 206 is representative of a CRANE Convex Sole composite golf club head available from Crane Golf of Tokyo, Japan. The fifth row of sound levels 208 is representative of a CRANE BACKWEIGHT composite golf club head available from Crane Golf of Tokyo, Japan. The sixth and seventh rows of sound levels represent composite golf club heads 20 according to the present invention. The CRANE BACKWEIGHT golf club will be used for comparison since it had the most relevant combined sound levels of the prior art composite golf club heads.

After the first 0.0025 seconds from initial impact, the golf club head 20 of the present invention had a combined sound level of greater than one hundred twenty decibels while the CRANE BACKWEIGHT golf club had a sound pressure level of only one hundred sixteen decibels. More interesting is the sound level comparison at later times after impact with a golf ball. At the second time step, 0.0050 seconds, wherein the golf club head 20 of the present invention had a sound level of at least one hundred nineteen decibels as compared to the CRANE BACKWEIGHT which had a combined sound level of one hundred twelve decibels. At the third time step, 0.0075 seconds, the CRANE BACKWEIGHT only had a combined sound level of one hundred five decibels while the present invention had a sound level of at least one hundred twelve decibels. At 0.04 seconds, the CRANE BACKWEIGHT only had a sound level of sixty decibels while the present invention had a sound level of at least seventy-five decibels and even as high as seventy-eight decibels. Thus, the composite golf club head 20 of the present invention has a higher sound level over a greater period of time than composite golf club heads of the prior art.

TABLE 1

| Time (sec) | Background | Yonex ADX 100 | Yonex Aerona 300 | Crane Convex | Crane Back Weight 1 | Present Invention | Present Invention |
| --- | --- | --- | --- | --- | --- | --- | --- |
| 0 | 37.0079 | 107.4928 | 104.8193 | 103.7921 | 99.91 | 105.6399 | 99.1613 |
| 0.0025 | 37.9587 | 108.9466 | 109.6095 | 113.2363 | 116.2099 | 120.8939 | 118.5447 |
| 0.005 | 36.9911 | 99.3109 | 101.132 | 107.87 | 112.2313 | 119.1895 | 119.5097 |
| 0.0075 | 37.032 | 93.6725 | 95.402 | 102.3722 | 105.0729 | 112.465 | 111.7032 |
| 0.01 | 37.356 | 88.7265 | 88.4427 | 95.5095 | 99.0554 | 106.7893 | 108.7282 |
| 0.0125 | 37.3444 | 82.8062 | 81.3996 | 88.1904 | 95.4798 | 106.3162 | 104.9815 |
| 0.015 | 37.1404 | 75.585 | 75.1601 | 82.1239 | 90.6532 | 102.4859 | 101.9998 |
| 0.0175 | 38.184 | 70.6195 | 76.2927 | 77.0363 | 85.4016 | 96.0577 | 96.4687 |
| 0.02 | 37.9554 | 69.9802 | 76.5289 | 71.9796 | 83.8524 | 92.4694 | 95.3743 |
| 0.0225 | 37.6366 | 68.2596 | 72.5207 | 69.999 | 80.4248 | 92.3186 | 92.5836 |
| 0.025 | 36.6031 | 65.3518 | 67.7613 | 68.3246 | 75.3896 | 89.8582 | 89.686 |
| 0.0275 | 38.6572 | 63.7651 | 67.144 | 65.5629 | 75.2513 | 87.0496 | 87.2424 |
| 0.03 | 38.7845 | 61.6809 | 64.0435 | 64.583 | 73.476 | 83.5488 | 84.2677 |
| 0.0325 | 37.4285 | 60.1254 | 61.2035 | 61.404 | 70.5492 | 82.544 | 82.9596 |
| 0.035 | 37.8823 | 60.7698 | 60.577 | 60.3388 | 66.3895 | 78.8759 | 81.3404 |
| 0.0375 | 38.1473 | 59.6408 | 59.684 | 59.4626 | 64.1515 | 75.6976 | 78.3018 |
| 0.04 | 37.218 | 58.5374 | 59.0628 | 58.5545 | 60.8302 | 74.4268 | 75.6263 |
| 0.0425 | 37.668 | 57.7982 | 57.7578 | 57.429 | 60.2753 | 72.5928 | 75.9623 |
| 0.045 | 36.2958 | 57.6423 | 57.1241 | 57.1239 | 58.9161 | 70.4171 | 71.3526 |
| 0.0475 | 36.7361 | 57.0152 | 57.9835 | 55.768 | 59.4466 | 66.8756 | 70.9058 |
| 0.05 | 37.3559 | 56.0984 | 56.3175 | 56.9781 | 58.6686 | 66.7363 | 70.9691 |
| 0.0525 | 36.6182 | 56.2689 | 56.1035 | 56.0582 | 59.1057 | 64.2596 | 69.5277 |
| 0.055 | 36.2706 | 57.2974 | 55.1731 | 56.048 | 60.3141 | 64.4919 | 67.4134 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A fairway wood or driver golf club head comprising:

a hollow body having a crown, a sole, ribbon and a striking plate, the hollow body composed of a plurality of plies of pre-preg sheets containing fibers, the crown having a substantially flat central section, a downwardly convex hosel section, a downwardly convex toe section, a first downwardly convex rear section and a second downwardly convex rear section;

a weight strip disposed within the ribbon; and a sole plate having an integral hosel tube, the sole plate attached to the sole and the integral hosel tube disposed in the hollow interior;

wherein the golf club head has a volume ranging from 175 cubic centimeters to 400 cubic centimeters and the golf club head has a combined sound level greater than one hundred seventeen decibels after 0.0025 seconds from initial impact with a golf ball at approximately 120 miles per hour to approximately 128 miles per hour, when measured from a distance of sixty-four inches from the impact point.

* * * * *